US010304264B2

(12) United States Patent
Camisa

(10) Patent No.: US 10,304,264 B2
(45) Date of Patent: May 28, 2019

(54) SYSTEMS AND METHODS FOR DETERMINING VEHICLE OPERATIONAL STATUS

(71) Applicant: CalAmp Corp., Irvine, CA (US)

(72) Inventor: Bret John Camisa, Irvine, CA (US)

(73) Assignee: CalAmp Corp., Irvine, CA (US)

( * ) Notice: Subject to any disclaimer, the term of this patent is extended or adjusted under 35 U.S.C. 154(b) by 93 days.

(21) Appl. No.: 15/586,122

(22) Filed: May 3, 2017

(65) Prior Publication Data

US 2017/0236339 A1  Aug. 17, 2017

Related U.S. Application Data

(63) Continuation of application No. 14/719,618, filed on May 22, 2015, now Pat. No. 9,644,977.

(51) Int. Cl.
*G01S 19/13* (2010.01)
*G07C 5/08* (2006.01)
(Continued)

(52) U.S. Cl.
CPC .............. *G07C 5/085* (2013.01); *B60W 20/12* (2016.01); *B60W 20/19* (2016.01); *G01C 21/20* (2013.01);
(Continued)

(58) Field of Classification Search
CPC ....... G07C 5/085; G07C 5/008; B60W 20/12; B60W 20/19; G01C 21/20; G01C 21/34; B60C 1/00
(Continued)

(56) References Cited

U.S. PATENT DOCUMENTS

| 4,549,277 A | 10/1985 | Brunson et al. |
| 5,117,375 A | 5/1992 | Worcester et al. |

(Continued)

FOREIGN PATENT DOCUMENTS

| WO | 20000017607 | 3/2000 |
| WO | 20020018873 | 3/2002 |

(Continued)

OTHER PUBLICATIONS

International Preliminary Report on Patentability for International Application PCT/US2016/033621, dated Nov. 28, 2017, dated Dec. 7, 2017, 7 Pgs.

(Continued)

*Primary Examiner* — Peter D Nolan
*Assistant Examiner* — Wae L Louie
(74) *Attorney, Agent, or Firm* — KPPB LLP

(57) ABSTRACT

Systems and methods for determining vehicle operational status in accordance with embodiments of the invention are disclosed. In one embodiment, a vehicle status determination device includes a processor and a memory connected to the processor and storing a vehicle status determination application, wherein the vehicle status determination application directs the processor to determine ignition state data indicating that the vehicle is in a trip based on engine RPM data, where the engine RPM data describes the speed at which the engine is running, record vehicle status data while the vehicle is in the trip, obtain vehicle trip end data indicating that the vehicle is no longer in a trip based on the engine RPM data and a threshold value, where the trip has ended when the engine RPM data is below the threshold value for a period of time, and generate vehicle trip data based on the vehicle status data.

20 Claims, 5 Drawing Sheets

(51) Int. Cl.

| | | |
|---|---|---|
| *G01C 21/34* | (2006.01) | |
| *G01C 21/20* | (2006.01) | |
| *G07C 5/00* | (2006.01) | |
| *B60W 20/12* | (2016.01) | |
| *B60W 20/19* | (2016.01) | |
| *B60W 20/00* | (2016.01) | |
| *G06F 17/00* | (2019.01) | |
| *B60Q 1/00* | (2006.01) | |
| *G06F 7/00* | (2006.01) | |
| *B60C 1/00* | (2006.01) | |

(52) U.S. Cl.
CPC ............ *G01C 21/34* (2013.01); *G01S 19/13* (2013.01); *G07C 5/008* (2013.01); *B60C 1/00* (2013.01); *B60Q 1/00* (2013.01); *B60W 20/00* (2013.01); *B60W 2510/06* (2013.01); *G06F 7/00* (2013.01); *G06F 17/00* (2013.01); *G07C 5/00* (2013.01)

(58) Field of Classification Search
USPC ............... 701/29.1, 34.4, 22; 705/1.1, 22
See application file for complete search history.

(56) References Cited

U.S. PATENT DOCUMENTS

| | | |
|---|---|---|
| 5,251,161 A | 10/1993 | Gioutsos et al. |
| 5,339,242 A | 8/1994 | Jensen et al. |
| 5,559,699 A | 9/1996 | Gioutsos et al. |
| 5,563,791 A | 10/1996 | Gioutsos et al. |
| 5,587,906 A | 12/1996 | Muckley et al. |
| 5,684,701 A | 11/1997 | Breed et al. |
| 5,758,301 A | 5/1998 | Saito et al. |
| 5,780,782 A | 7/1998 | O'Dea et al. |
| 5,825,283 A | 10/1998 | Camhi |
| 5,841,201 A | 11/1998 | Ibaraki et al. |
| 5,862,511 A | 1/1999 | Croyle et al. |
| 5,978,722 A | 11/1999 | Takasuka et al. |
| 6,029,111 A | 2/2000 | Croyle |
| 6,076,028 A | 6/2000 | Donnelly et al. |
| 6,085,151 A | 7/2000 | Farmer et al. |
| 6,163,690 A | 12/2000 | Lilja |
| 6,269,290 B1 | 7/2001 | Tsuji et al. |
| 6,308,134 B1 | 10/2001 | Croyle et al. |
| 6,346,876 B1 | 2/2002 | Flick |
| 6,356,841 B1 | 3/2002 | Hamrick et al. |
| 6,363,308 B1 | 3/2002 | Potti et al. |
| 6,401,027 B1 | 6/2002 | Xu et al. |
| 6,417,802 B1 | 7/2002 | Diesel et al. |
| 6,431,593 B1 | 8/2002 | Cooper et al. |
| 6,438,475 B1 | 8/2002 | Gioutsos et al. |
| 6,532,419 B1 | 3/2003 | Begin |
| 6,540,255 B1 | 4/2003 | Garcia et al. |
| 6,611,755 B1 | 8/2003 | Coffee et al. |
| 6,737,989 B2 | 5/2004 | Flick |
| 6,756,885 B1 | 6/2004 | Flick |
| 6,812,888 B2 | 11/2004 | Drury et al. |
| 6,832,140 B2 | 12/2004 | Fan et al. |
| 7,015,830 B2 | 3/2006 | Flick |
| 7,020,501 B1 | 3/2006 | Elliott et al. |
| 7,085,637 B2 | 8/2006 | Breed et al. |
| 7,110,880 B2 | 9/2006 | Breed et al. |
| 7,250,850 B2 | 7/2007 | Mizutani |
| 7,272,493 B1 | 9/2007 | Hamrick et al. |
| 7,286,929 B2 | 10/2007 | Staton et al. |
| 7,348,895 B2 | 3/2008 | Lagassey et al. |
| 7,366,608 B2 | 4/2008 | Hamrick et al. |
| 7,460,954 B2 | 12/2008 | Hamrick et al. |
| 7,484,756 B2 | 2/2009 | Chou et al. |
| 7,527,288 B2 | 5/2009 | Breed et al. |
| 7,577,525 B2 | 8/2009 | Hamrick et al. |
| 7,643,919 B2 | 1/2010 | Nicaise |
| 7,671,727 B2 | 3/2010 | Flick |
| 7,725,218 B2 | 5/2010 | Hamrick et al. |
| 7,765,039 B1 | 7/2010 | Hagenbuch |
| 7,805,231 B2 | 9/2010 | Cluff et al. |
| 8,004,397 B2 | 8/2011 | Forrest et al. |
| 8,010,251 B2 | 8/2011 | Hamrick et al. |
| 8,032,278 B2 | 10/2011 | Flick |
| 8,489,271 B2 | 7/2013 | Hergesheimer et al. |
| 8,688,380 B2 | 4/2014 | Cawse et al. |
| 8,762,009 B2 | 6/2014 | Ehrman et al. |
| 8,799,034 B1 | 8/2014 | Brandmaier et al. |
| 8,812,173 B2 | 8/2014 | Chen et al. |
| 9,002,538 B2 | 4/2015 | Hergesheimer et al. |
| 9,179,497 B1 | 11/2015 | Teixeira et al. |
| 9,217,757 B2 | 12/2015 | Hergesheimer et al. |
| 9,406,222 B2 | 8/2016 | Hergesheimer et al. |
| 9,457,754 B1 | 10/2016 | Christensen et al. |
| 9,459,277 B2 | 10/2016 | Hergesheimer et al. |
| 9,491,420 B2 | 11/2016 | Mimar |
| 9,644,977 B2 | 5/2017 | Camisa |
| 2002/0013648 A1 | 1/2002 | Feser et al. |
| 2002/0100310 A1 | 8/2002 | Begin |
| 2002/0124166 A1 | 9/2002 | Lee et al. |
| 2003/0001368 A1 | 1/2003 | Breed et al. |
| 2003/0028766 A1 | 2/2003 | Gass et al. |
| 2003/0151507 A1 | 8/2003 | Andre et al. |
| 2003/0176959 A1 | 9/2003 | Breed et al. |
| 2003/0236970 A1 | 12/2003 | Palmer et al. |
| 2004/0036261 A1 | 2/2004 | Breed et al. |
| 2004/0075539 A1 | 4/2004 | Savoie et al. |
| 2004/0155790 A1 | 8/2004 | Tsuji et al. |
| 2004/0257208 A1 | 12/2004 | Huang et al. |
| 2005/0065711 A1 | 3/2005 | Dahlgren et al. |
| 2005/0099289 A1 | 5/2005 | Arita et al. |
| 2006/0022469 A1 | 2/2006 | Syed et al. |
| 2006/0041336 A1 | 2/2006 | Schubert et al. |
| 2006/0050953 A1 | 3/2006 | Farmer et al. |
| 2007/0027612 A1 | 2/2007 | Barfoot et al. |
| 2007/0109117 A1 | 5/2007 | Heitzmann et al. |
| 2007/0257791 A1 | 11/2007 | Arita et al. |
| 2007/0266078 A1 | 11/2007 | Rittle et al. |
| 2007/0271014 A1* | 11/2007 | Breed ................ B60J 10/00 701/31.9 |
| 2007/0299587 A1 | 12/2007 | Breed et al. |
| 2008/0111666 A1 | 5/2008 | Plante et al. |
| 2008/0114545 A1 | 5/2008 | Takaoka et al. |
| 2008/0150707 A1* | 6/2008 | Shamoto ............... G07B 15/02 340/425.5 |
| 2008/0195261 A1 | 8/2008 | Breed |
| 2008/0202199 A1 | 8/2008 | Finley et al. |
| 2008/0211666 A1 | 9/2008 | Saidi et al. |
| 2008/0211914 A1 | 9/2008 | Herrera et al. |
| 2008/0275601 A1 | 11/2008 | Saito et al. |
| 2009/0037056 A1 | 2/2009 | Erb |
| 2009/0217733 A1 | 9/2009 | Stachow |
| 2010/0039216 A1 | 2/2010 | Knight et al. |
| 2010/0039247 A1 | 2/2010 | Ziegler et al. |
| 2010/0039318 A1 | 2/2010 | Kmiecik et al. |
| 2010/0097316 A1 | 4/2010 | Shaw et al. |
| 2010/0122246 A1 | 5/2010 | Gesquiere et al. |
| 2010/0185524 A1* | 7/2010 | Watkins ................ G06Q 10/08 705/22 |
| 2010/0241838 A1 | 9/2010 | Cohen et al. |
| 2010/0279647 A1 | 11/2010 | Jacobs et al. |
| 2010/0312473 A1 | 12/2010 | Hoshizaki |
| 2010/0318257 A1 | 12/2010 | Kalinadhabhotla |
| 2011/0060496 A1 | 3/2011 | Nielsen et al. |
| 2011/0106373 A1 | 5/2011 | Hergesheimer et al. |
| 2011/0109438 A1 | 5/2011 | Dijkstra et al. |
| 2011/0153367 A1 | 6/2011 | Amigo |
| 2011/0202225 A1 | 8/2011 | Willis et al. |
| 2011/0264393 A1 | 10/2011 | An |
| 2011/0320088 A1* | 12/2011 | Eom ................... B60K 35/00 701/34.4 |
| 2012/0022780 A1 | 1/2012 | Kulik et al. |
| 2012/0050095 A1 | 3/2012 | Scherzinger |
| 2012/0146766 A1 | 6/2012 | Geisler et al. |
| 2012/0158211 A1 | 6/2012 | Chen et al. |
| 2012/0253585 A1 | 10/2012 | Harvie |
| 2012/0259526 A1 | 10/2012 | Inoue |

(56) References Cited

U.S. PATENT DOCUMENTS

| | | | |
|---|---|---|---|
| 2012/0303203 A1* | 11/2012 | Olsen | G08G 1/012 701/29.1 |
| 2012/0331181 A1 | 12/2012 | Govande et al. | |
| 2013/0002415 A1* | 1/2013 | Walli | B60L 1/00 340/438 |
| 2013/0013907 A1 | 1/2013 | Marino et al. | |
| 2013/0024202 A1* | 1/2013 | Harris | G06Q 30/00 705/1.1 |
| 2013/0038439 A1* | 2/2013 | Saito | B60K 6/445 340/439 |
| 2013/0073142 A1 | 3/2013 | Hergesheimer et al. | |
| 2013/0204572 A1 | 8/2013 | Sato | |
| 2013/0275001 A1 | 10/2013 | Hergesheimer et al. | |
| 2013/0297137 A1* | 11/2013 | Fushiki | B60K 6/445 701/22 |
| 2014/0074353 A1 | 3/2014 | Lee et al. | |
| 2014/0111354 A1 | 4/2014 | Hergesheimer et al. | |
| 2014/0118132 A1 | 5/2014 | Braunberger et al. | |
| 2014/0149145 A1 | 5/2014 | Peng | |
| 2014/0173581 A1 | 6/2014 | Grinberg et al. | |
| 2014/0180529 A1 | 6/2014 | Simon et al. | |
| 2014/0189335 A1 | 7/2014 | Liu et al. | |
| 2014/0236518 A1 | 8/2014 | Hergesheimer et al. | |
| 2014/0236519 A1 | 8/2014 | Hergesheimer et al. | |
| 2014/0358394 A1* | 12/2014 | Picciotti | G06F 21/6218 701/70 |
| 2015/0015385 A1* | 1/2015 | Tomita | G08G 1/205 340/436 |
| 2015/0051796 A1 | 2/2015 | Levy | |
| 2015/0149218 A1 | 5/2015 | Bayley et al. | |
| 2015/0161391 A1 | 6/2015 | Johnsen et al. | |
| 2015/0339241 A1 | 11/2015 | Warner et al. | |
| 2016/0162284 A1 | 6/2016 | Meng et al. | |
| 2016/0335813 A1 | 11/2016 | Hergesheimer et al. | |
| 2016/0341559 A1* | 11/2016 | Camisa | G01C 21/34 |
| 2017/0017766 A1 | 1/2017 | Giraud | |
| 2017/0023610 A1 | 1/2017 | Hergesheimer et al. | |
| 2018/0012429 A1 | 1/2018 | Jenkins et al. | |
| 2018/0053354 A1 | 2/2018 | Jenkins et al. | |

FOREIGN PATENT DOCUMENTS

| | | |
|---|---|---|
| WO | 2014130077 A1 | 8/2014 |
| WO | 2014130078 A1 | 8/2014 |
| WO | 2015183677 A1 | 12/2015 |
| WO | 2016191306 | 12/2016 |
| WO | 2018035065 A1 | 2/2018 |

OTHER PUBLICATIONS

Extended European Search Report for European Application No. 13875407.2, Search completed Nov. 22, 2016, dated Nov. 30, 2016, 7 Pgs.

International Preliminary Report on Patentability for International Application PCT/US2013/054939, dated Aug. 25, 2015, dated Sep. 3, 2015, 4 Pgs.

International Preliminary Report on Patentability for International Application PCT/US2013/054943, dated Aug. 25, 2015, dated Sep. 3, 2015, 6 Pgs.

International Search Report and Written Opinion for International Application No. PCT/US13/54939, Completed Feb. 5, 2014, dated Feb. 24, 2014, 5 pgs.

International Search Report and Written Opinion for International Application No. PCT/US13/54943, Completed Feb. 13, 2014, dated Feb. 27, 2014, 6 pgs.

International Search Report and Written Opinion for International Application No. PCT/US2016/033621, completed Jul. 28, 2016, dated Aug. 5, 2016, 11 Pgs.

"Road vehicles—Diagnostic Systems—Part 2: CARB requirements for interchange of digital information", ISO 9141-2, 1994, 18 pgs.

"Surface Vehicle Recommended Practice, E/E Diagnostic Test Modes, Dec. 1991, 32 pgs."

"Surface Vehicle Recommended Practice, Universal Interface for OBD II Scan, Jun. 30, 1993, 45 pgs.", SAE International Surface Vehicle Recommended Practice, "Universal Interface for OBD II Scan", SAE Standard J2201, Issued Jun. 30, 1993.

"Surface Vehicle Recommended Practice; OBD II Scan Tool, Mar. 1992, 14 pgs."

* cited by examiner

SYSTEMS AND METHODS FOR DETERMINING VEHICLE OPERATIONAL STATUS

CROSS-REFERENCE TO RELATED APPLICATIONS

The instant application claims priority to U.S. patent application Ser. No. 14/719,618, filed May 22, 2015 and issued as U.S. Pat. No. 9,644,977 on May 9, 2017, the disclosure of which is hereby incorporated by reference in its entirety.

FIELD OF THE INVENTION

The present invention relates to determining vehicle operational status and more specifically to determining vehicle operational status for hybrid and electric vehicles.

BACKGROUND

A Global Positioning System (GPS) is a space-based global navigation satellite system that utilizes a network of geo-synchronous satellites that can be utilized by a GPS receiver to determine its location. Many telematics systems incorporate a Global Positioning System (GPS) receiver that can be used to obtain the location of a vehicle at a certain measured time. Using the signals received by the GPS receiver, the heading information of the vehicle can be determined. A GPS receiver can determine velocity information in a variety of ways including, but not limited to, measuring the Doppler shift of the received signals and by comparing the location of a vehicle at a plurality of measured times. The acceleration of the vehicle can be determined as the change in speed divided by the time between the measurements. A GPS receiver's ability to determine acceleration can be limited due to the dependence of the measurement upon factors such as, but not limited to, reception and satellite availability. In addition to location information, a GPS receiver can also be configured to provide time data. However, measurements determined via a GPS receiver can contain errors that affect the accuracy of the measured information. In particular, GPS signals are vulnerable to signal delays, inconsistencies of atmospheric conditions that affect the speed of the GPS signals as they pass through the Earth's atmosphere, and multipath distortions. Additionally, other factors not listed above can influence GPS signals and result in measurement errors.

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

A common problem encountered during installation of devices in a motor vehicle that connect to the vehicle's electrical system is that the installer may inadvertently connect an ignition input interface to a wire that is not the vehicle ignition line. U.S. Pat. No. 6,163,690, the disclosure of which is incorporated by reference herein in its entirety, notes the potential for the ignition sense line of a hands-free adapter for a mobile phone to be incorrectly connected to a line other than the ignition line due to installer error, which can result in the hands-free adaptor believing the ignition is always on and undesirably draining the vehicle's battery. U.S. Pat. No. 6,163,690 proposes a system that checks the correctness of the ignition sense line installation by monitoring the ignition sense line to determine whether the ignition line is switched off within a predetermined time period. In the event that the hands-free adaptor detects that the ignition line is always on, the hands-free adaptor provides an indication that it has been installed incorrectly.

SUMMARY OF THE INVENTION

Systems and methods for determining vehicle operational status in accordance with embodiments of the invention are disclosed. In one embodiment, a vehicle status determination device includes a processor and a memory connected to the processor and storing a vehicle status determination application, wherein the vehicle status determination device is installed in a vehicle, and wherein the vehicle status determination application directs the processor to determine ignition state data indicating that the vehicle is in a trip, record vehicle status data while the vehicle is in the trip, obtain vehicle trip end data indicating that the vehicle is no longer in a trip, and generate vehicle trip data based on the vehicle status data.

In another embodiment of the invention, the vehicle status determination device further includes an accelerometer, where the accelerometer generates acceleration data.

In an additional embodiment of the invention, the ignition state data includes the acceleration data.

In yet another additional embodiment of the invention, the vehicle status data includes the acceleration data.

In still another additional embodiment of the invention, the vehicle status determination device further includes a location determination device, where the location determination device generates location data.

In yet still another additional embodiment of the invention, the location determination device includes a Global Positioning System (GPS) receiver.

In yet another embodiment of the invention, the ignition state data includes the location data.

In still another embodiment of the invention, the vehicle status data includes the location data.

In yet still another embodiment of the invention, the vehicle status determination device further includes a vibration determination device, where the vibration determination device generates vibration data.

In yet another additional embodiment of the invention, the ignition state data includes the vibration data.

In still another additional embodiment of the invention, the vehicle status data includes the vibration data.

In yet still another additional embodiment of the invention, the vibration data is indicative of a running engine.

In yet another embodiment of the invention, the vehicle status determination device further includes a voltage detector, where the voltage detector generates voltage data.

In still another embodiment of the invention, the ignition state data includes the voltage data.

In yet still another embodiment of the invention, the vehicle status data includes the voltage data.

In yet another additional embodiment of the invention, the vehicle status determination application directs the processor to enter a low-power mode when the vehicle trip end data indicates that the vehicle is no longer in a trip.

In still another additional embodiment of the invention, the vehicle status determination application directs the processor to enter an operating mode when the ignition state data indicates that the vehicle is in a trip.

In yet still another additional embodiment of the invention, the vehicle status determination device further includes a connector connected to a vehicle data bus within the vehicle and the vehicle status determination application directs the processor to obtain vehicle status data using the vehicle data bus.

In yet another embodiment of the invention, the vehicle status determination device further includes a communications interface connected to the processor and the vehicle status determination application directs the processor to provide the vehicle trip data using the communications interface.

Still another embodiment of the invention includes a method for determining the operational status of a vehicle, including determining ignition state data indicating that the vehicle is in a trip using a vehicle status determination device installed in the vehicle, where the vehicle status determination devices includes a processor and a memory connected to the processor, recording vehicle status data while the vehicle is in the trip using the vehicle status determination device, obtaining vehicle trip end data indicating that the vehicle is no longer in a trip using the vehicle status determination device, and generating vehicle trip data based on the vehicle status data using the vehicle status determination device.

Yet another embodiment of the invention includes a vehicle status determination device including a processor and a memory connected to the processor and storing a vehicle status determination application, wherein the vehicle status determination device is installed in a vehicle and wherein the vehicle status determination application directs the processor to determine ignition state data indicating that the vehicle is in a trip based on engine RPM data, where the engine RPM data describes the speed at which the engine is running, record vehicle status data while the vehicle is in the trip, obtain vehicle trip end data indicating that the vehicle is no longer in a trip based on the engine RPM data and a threshold value, where the trip has ended when the engine RPM data is below the threshold value for a period of time, and generate vehicle trip data based on the vehicle status data.

Still another embodiment of the invention includes a method for determining the operational status of a vehicle including determining ignition state data indicating that the vehicle is in a trip based on engine RPM data using a vehicle status determination device installed in the vehicle, where the vehicle status determination devices includes a processor and a memory connected to the processor and the engine RPM data describes the speed at which the engine is running, recording vehicle status data while the vehicle is in the trip using the vehicle status determination device, obtaining vehicle trip end data indicating that the vehicle is no longer in a trip based on the engine RPM data and a threshold value using the vehicle status determination device, where the trip has ended when the engine RPM data is below the threshold value for a period of time, and generating vehicle trip data based on the vehicle status data using the vehicle status determination device.

DETAILED DESCRIPTION

Figure 1:
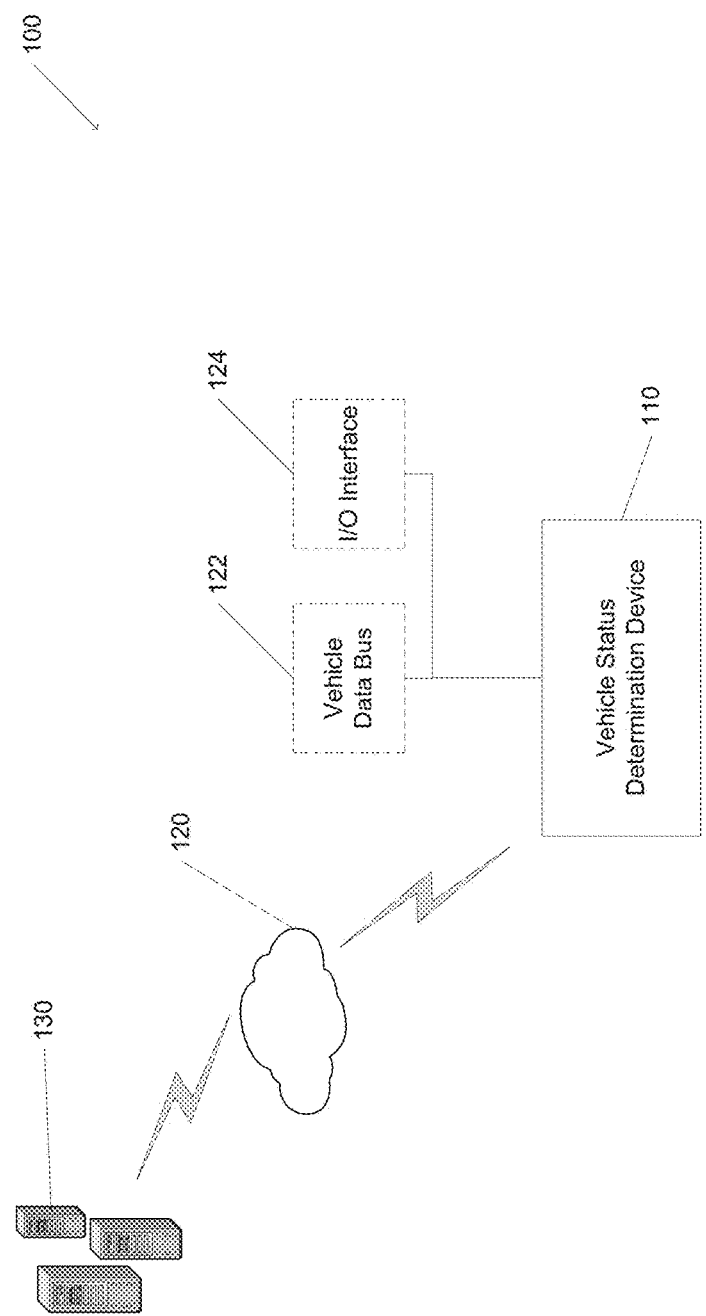
FIG. 1 is a conceptual illustration of a vehicle status determination system in accordance with an embodiment of the invention.

Turning now to the drawings, systems and methods for determining the operational status of a vehicle in accordance with embodiments of the invention are disclosed. In many instances, vehicle status determination devices are installed in a location in a vehicle where a vehicle ignition line is unavailable to the device. In several embodiments, the vehicle ignition line is available and the device does not utilize a connection to the vehicle ignition line. In a number of embodiments, vehicle ignition state (i.e. the operational status of the vehicle) is ascertained by monitoring the vehicle for signs indicative of the vehicle ignition state without directly connecting to the vehicle ignition line. Information indicative of vehicle ignition state (i.e. vehicle status data) can be ascertained by observing characteristics of the vehicle including but not limited to the power supplied by the vehicle, vehicle vibration, communications on an OBD II or other vehicle data bus line, and/or vehicle position information. In many embodiments, multiple different types of information are combined to ascertain the vehicle ignition state. Although much of the following discussion references vehicle telematics systems, systems and methods in accordance with embodiments of the invention can be implemented in other devices that connect to a vehicle power supply. Systems and methods for using a device added to the vehicle after the manufacture of the vehicle without a direct connection to the vehicle ignition line that can be utilized in accordance with embodiments of the invention are described in U.S. Pat. No. 8,489,271, titled "Systems and Methods for Virtual Ignition Detection" and issued Jul. 16, 2013, the disclosure of which is hereby incorporated by reference in its entirety.

The popularity of hybrid vehicles, which can operate at times without the gas engine being on, and electric vehicles presents unique challenges for determining the ignition state of a vehicle. For example, the RPM of the engine can analyzed to determine when the engine is running. A hybrid (or electric) vehicle may not have engine RPM readings when in electric mode. That is, a hybrid or electric vehicle may be in operation (i.e. in a trip) but not have a measurable engine RPM. Furthermore, the analysis of the ignition status of the vehicle is often used to determine the start and stop of a trip. Vehicle operational status devices in accordance with embodiments of the invention utilize a variety of inputs, which can include Global Positioning System (GPS) data, acceleration data, voltage data, RPM data, and/or time hysteresis, to determine whether a vehicle is on a trip. Based on the trip data, the ignition state of the vehicle can be determined as appropriate to the requirements of specific applications of embodiments of the invention. In a number of embodiments, a determination of the make and model for a vehicle can be performed in order to determine a particular process to be utilized for determining the operational status of a vehicle.

In accordance with many embodiments of the invention, vehicle speed can be calculated using information provided by a Global Position System (GPS) receiver by dividing the distance traveled by the GPS receiver by the time between measurements taken by the GPS receiver. In several embodiments, the GPS receiver is configured to determine velocity information using the signals received by the GPS receiver. A GPS receiver can determine velocity information in a variety of ways in accordance with embodiments of the invention, including, but not limited to, measuring the Doppler shift of the received signals. The differences in vehicle speed between measurements taken by the GPS receiver can be used to determine acceleration data for the vehicle. GPS receivers are also capable of determining the location of a vehicle and/or the heading of the vehicle utilizing the received signals. A variety of devices other than GPS receivers can be utilized in vehicles to determine information related to the vehicle, such as speed, acceleration, and heading. For example, acceleration information for a vehicle can be measured using an accelerometer, which are often installed on a vehicle or mobile device. Heading information can be determined using a compass. Vibration information can be determined using acceleration information taken using an acceleration sensor. Systems and methods for calibrating a 3-axis accelerometer which can be utilized to determine vibration information in accordance with a variety of embodiments of the invention is disclosed in U.S. Patent Publication No. 2013/0073142, titled "Systems and Methods for 3-Axis Accelerometer Calibration" and published Mar. 21, 2013, the entirety of which is hereby incorporated by reference. Other devices not specifically described above can be utilized to measure or detect information relevant to the operation of a vehicle in accordance with embodiments of the invention.

The determination of the ignition status of a vehicle and/or the start of a trip can be utilized in a variety of ways, such as determining particular events that occur during the operation of the vehicle. Systems and methods for detecting events that can be utilized in accordance with embodiments of the invention are described in U.S. Patent Publication No. 2014/0111354, titled "Systems and Methods for Location Reporting of Detected Events in Vehicle Operation" and published Apr. 24, 2014, the disclosure of which is hereby incorporated by reference in its entirety.

It should be noted that vehicle status determination devices can be installed in vehicles with the capability of automatically shutting down a gasoline (or diesel) engine without turning off the ignition in order to accurately determine the operational status of the vehicle as appropriate to the requirements of specific applications of embodiments of the invention. Systems and methods for determining the operational status of a vehicle in accordance with embodiments of the invention are discussed below.

Vehicle Status Determination Systems

Vehicle status determination systems can obtain a variety of data describing the status of a vehicle and determine when the vehicle is active. A conceptual diagram of a vehicle status determination system in accordance with an embodiment of the invention is shown in FIG. 1. The vehicle status determination system 100 includes a vehicle status determination device 110 that can communicate with a remote server system 130, a vehicle data bus 122, and/or an input/output (I/O) interface 124 as appropriate to the requirements of specific applications of embodiments of the invention. In a variety of embodiments, the vehicle status determination device 110 communicates with the remote server system 130 via a network 120. In a variety of embodiments, the network 120 is the Internet. In many embodiments, the network 120 is any wired or wireless network, such as a cellular network, between the vehicle status determination device 110 and the remote server system 130. In a number of embodiments, the remote server system 130 implemented using a single server system. In several embodiments, the remote server system 130 is implemented using multiple server systems.

In a variety of embodiments, the vehicle status determination device 110 is installed in a vehicle having a vehicle data bus 122. The vehicle status determination device 110 can obtain data from any of a variety of vehicle devices connected to the vehicle data bus 122 utilizing any of a variety of techniques as appropriate to the requirements of specific applications of embodiments of the invention. Vehicle devices can include, but are not limited to, engine sensors, electronic control unit (ECU) devices, alternator sensors, vibration sensors, voltage sensors, oxygen sensors, Global Positioning System (GPS) receivers, ignition devices, and/or acceleration determination devices. Systems and methods for connecting to a vehicle data bus that can be utilized in accordance with embodiments of the invention are described in SAE J1978, titled "OBD II Scan Tool," first published by SAE International of Troy, Michigan on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety.

The vehicle status determination device 110 can include any of a variety of sensors and/or devices, including those described above with respect to the vehicle data bus and those described in more detail below, to obtain data regarding the status of the vehicle. This data can be utilized in a variety of vehicle status determination processes to determine the operational status of the vehicle as described in more detail below. The vehicle status determination device 110 can also communicate with any of a variety of sensors and/or devices using the I/O interface 124. The I/O interface 124 can be any connection, including wired and wireless connections, as appropriate to the requirements of specific applications of embodiments of the invention. In several embodiments, the vehicle status determination device 110 is capable of executing scripts to read data and/or perform particular processes. These scripts can be pre-loaded on the device and/or obtained from the remote server system 130, vehicle data bus 122, and/or the I/O interface 124 as appropriate to the requirements of specific applications of embodiments of the invention.

The vehicle status determination device can be self-powered and/or connected into the electrical system of the vehicle in which the vehicle status determination device is installed. In a variety of embodiments, the vehicle status determination device is powered via the vehicle data bus 122 and/or the I/O interface 124.

In many embodiments, the vehicle status determination device utilizes a Global Positioning System (GPS) receiver in order to determine the location, speed, and/or acceleration of the vehicle. However, it should be noted that any location-determining techniques, such as cellular tower triangulation, wireless network geolocation techniques, and dead reckoning techniques, can be utilized as appropriate to the requirements of specific applications of embodiments of the invention.

In a variety of embodiments, the vehicle status determination device 110 and/or remote server system 130 provides a user interface allowing for visualizing and interacting with the data. In several embodiments, the vehicle status determination device 110 and/or remote server system 130 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture of a vehicle status determination system in accordance with embodiments of the invention are discussed above and illustrated in FIG. 1, a variety of architectures, including sensors and other devices and techniques not specifically described above, can be utilized in accordance with embodiments of the invention. Furthermore, the processes described herein can be performed using any combination the vehicle status determination device and/or the remote server systems as appropriate to the requirements of specific applications of embodiments of the invention.

Vehicle Status Determination Devices

Figure 2:
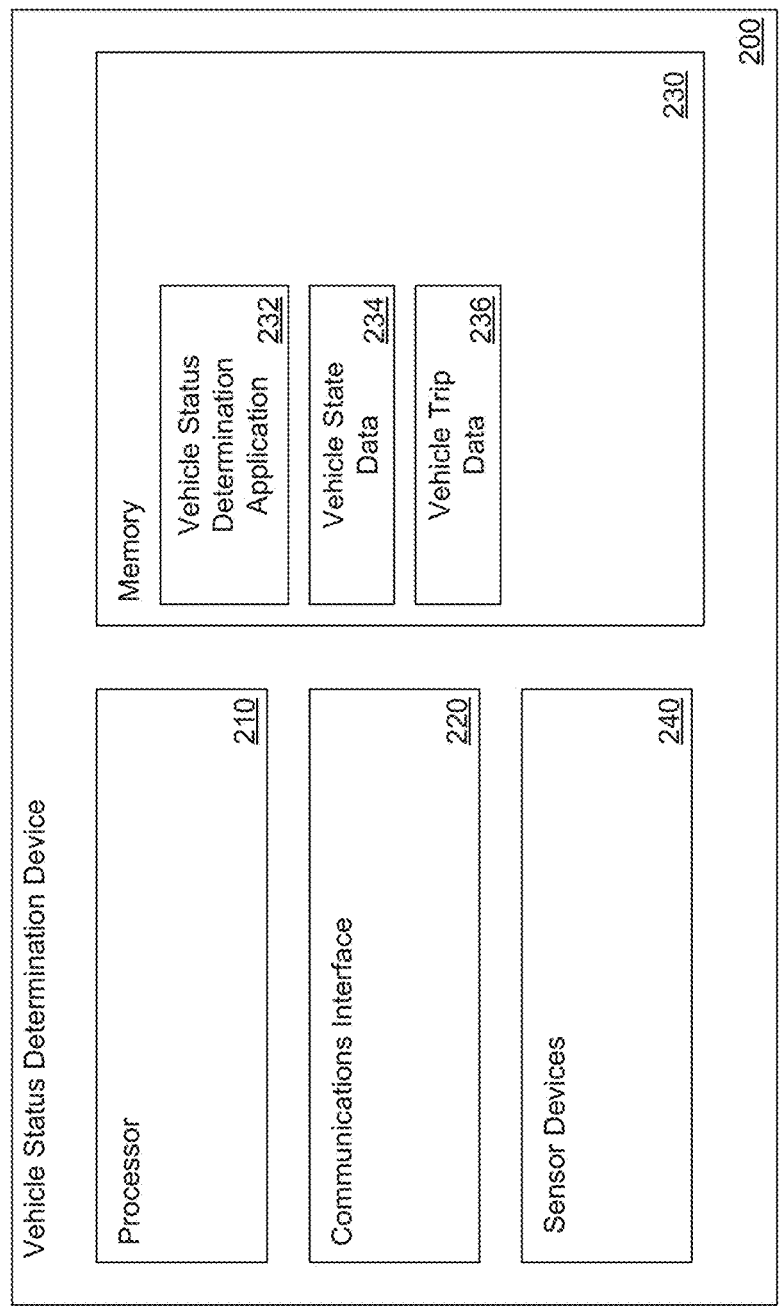
FIG. 2 is a conceptual illustration of a vehicle status determination device in accordance with an embodiment of the invention.

Vehicle status determination devices in accordance with embodiments of the invention can obtain data regarding the status of a vehicle and determine when the vehicle is active. A conceptual illustration of a vehicle status determination device in accordance with an embodiment of the invention is shown in FIG. 2. The vehicle status determination device 200 includes a processor 210 in communication with memory 230. The vehicle status determination device 200 can also include one or more communication interfaces 220 configured to send and receive data. In a number of embodiments, the communication interface 220 is in communication with the processor 210, the memory 230, and/or the sensor device(s) 240. In several embodiments, the memory 230 is any form of storage configured to store a variety of data, including, but not limited to, a vehicle status determination application 232, vehicle state data 234, and vehicle trip data 236. In many embodiments, vehicle status determination application 232, vehicle state data 234, and/or vehicle trip data 236 are stored using an external server system and received by the vehicle status determination device 200 using the communications interface 220.

The processor 210 is directed by the vehicle status determination application 232 to perform a variety of vehicle status determination processes. Vehicle status determination processes can include obtaining data from a variety of sensor devices, determining vehicle state data, and generating vehicle trip data. Sensor devices 240 include RPM sensors, voltage sensors, GPS receivers, noise sensors, vibration sensors, acceleration sensors, and any other device capable of measuring data regarding a vehicle as appropriate to the requirements of specific applications of embodiments of the invention. Sensor devices 240 can be included within the vehicle status determination device 200 and/or located external to the vehicle status determination device 200. The vehicle status determination device 200 can communicate with external sensor devices using the communications interface 220, such as via a vehicle data bus, I/O interface, and/or a network connection as appropriate to the requirements of specific applications of embodiments of the invention. In several embodiments, the vehicle state data 234 and/or vehicle trip data 236 are utilized to determine the ignition status of a vehicle. A number of vehicle status determination processes that can be performed in accordance with embodiments of the invention are described in more detail below.

Although a specific architecture for a vehicle status determination device in accordance with an embodiment of the invention is conceptually illustrated in FIG. 2, any of a variety of architectures, including those that store data or applications on disk or some other form of storage and are loaded into memory at runtime, can also be utilized. Additionally, the vehicle state data and/or vehicle trip data can be cached and transmitted once a network connection (such as a wireless network connection via the communications interface) becomes available. In a variety of embodiments, the memory 230 includes circuitry such as, but not limited to, memory cells constructed using transistors, that are configured to store instructions. Similarly, the processor 210 can include logic gates formed from transistors (or any other device) that are configured to dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Determining Vehicle Operational Status

As described above, determining the ignition status of a vehicle can be utilized to indicate the beginning and/or end of trips. Vehicle status data recorded during of the trip can then be used to analyze the performance of the vehicle during the trip. Vehicle status determination devices can perform a variety of vehicle status determination processes in order to determine when a vehicle is at rest and/or in a trip. In a variety of embodiments, one or more ignition determination processes can be utilized to determine the operational status of the vehicle. In many embodiments, a four-phase process can be utilized to determine the operational state of a vehicle. The first phase can include determining when the vehicle is in a state of rest. The second phase can include determining if a trip has started, the third phase can include obtaining data regarding the status of the vehicle during the trip, and the fourth phase can include determining when the trip has ended. However, it should be noted that any of a variety of phases and processes can be utilized as appropriate to the requirements of specific embodiments of the invention. In a number of embodiments, vehicle identification number (VIN) data is read and utilized to determine the make and model of a particular vehicle. The VIN data can then be utilized to select the specific processes and/or data that can be utilized to determine the operational state (i.e. the ignition status) of the vehicle.

A variety of data can be used to determine the operational status of hybrid and electric vehicles as described in more detail below. A variety of data can be analyzed based on the current state of the vehicle. For example, a first set of data can be utilized when a car is moving while a second set of data can be utilized when the car is stopped. However, determining when a car is stopped versus when the trip has ended can be difficult. For example, many vehicles have the capability of temporarily shutting off a gasoline (or diesel) engine while the car is active or stopped in traffic. The engine can then be restarted and/or an electric engine can be used to power the vehicle. In many embodiments, a timeout threshold is set to determine the difference between a temporary stop and the end of a trip. If the timeout threshold is too long, short trips can be missed. If the timeout threshold is too short, a single trip can be incorrectly divided into multiple trips. The timeout threshold can be pre-determined and/or determined dynamically as appropriate to the requirements of specific applications of embodiments of the invention. In several embodiments, the VIN data is utilized to determine the timeout threshold.

By way of example, a vehicle status determination device is installed in a hybrid vehicle and it has been determined that the vehicle is in a trip. In traffic, the vehicle can switch to electric-only mode, so there are no measurable engine RPMs and a smart alternator lowers battery voltage below 13.1 volts. As the vehicle is stopped, a GPS receiver detects no movement of the vehicle and no acceleration is measured and accelerometer measures zero acceleration data. The delay timer is started BUT if the accelerometer detects acceleration, the GPS records movement, the engine engages and RPM data is measure, and/or a voltage exceeding 13.1 volts is detected, the delay timer is reset and the vehicle status determination device continues recording vehicle status data. It should be noted that alternators in vehicles commonly produce voltage in excess of 13.1 volts in order to charge the battery in the vehicle while powering the electronic components of the vehicle. However, any voltage reading can be utilized as appropriate to the requirements of specific applications of embodiments of the invention.

Once a trip has been completed, the vehicle status data can be processed and/or otherwise augmented to generate vehicle trip data. The vehicle status data and/or vehicle trip data can be transmitted to a remote server system for processing, storage, and/or analysis. The data can be provided automatically, on a schedule, and/or in response to a request for data as appropriate to the requirements of specific applications of embodiments of the invention.

Figure 3:
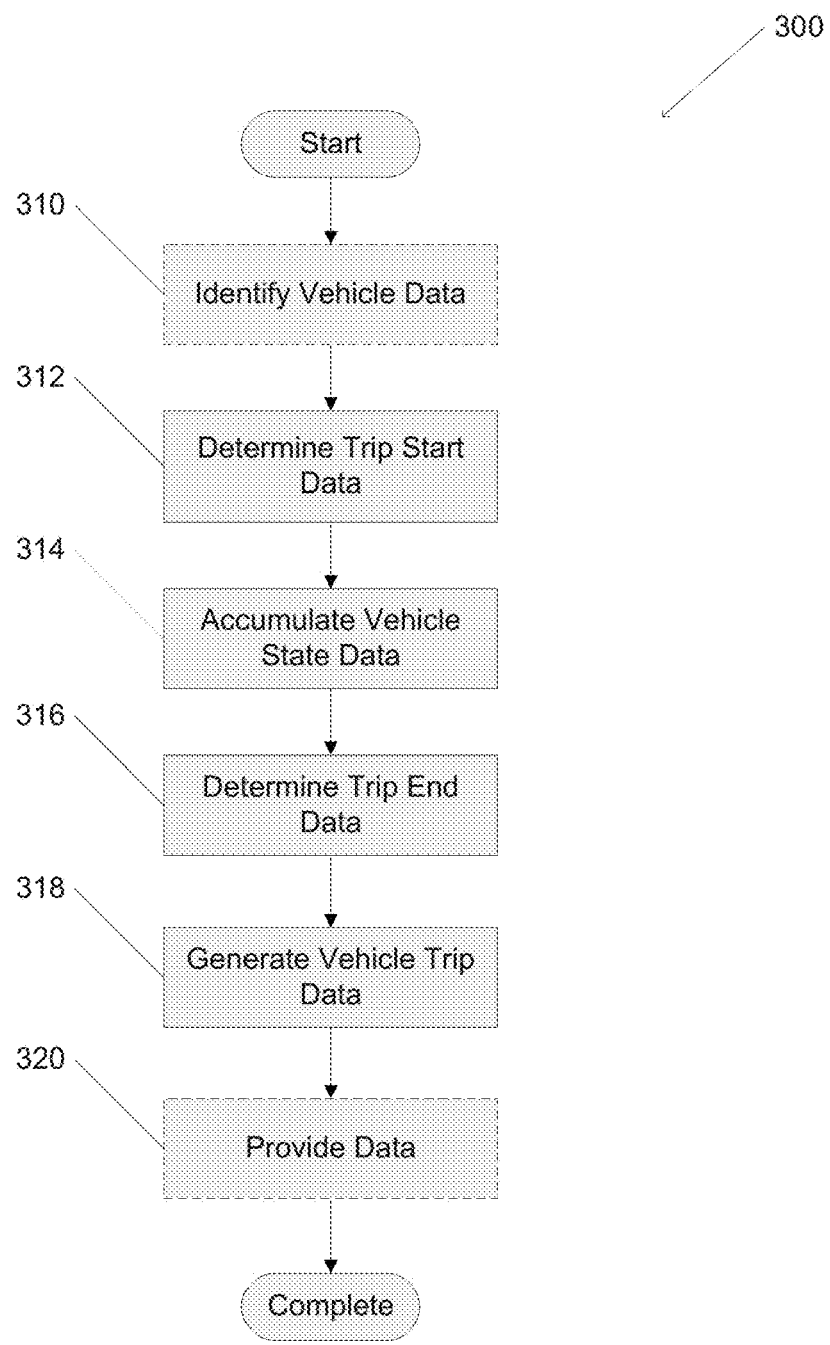
FIG. 3 is a flow chart illustrating a process for determining the operational status of a vehicle in accordance with an embodiment of the invention.

A process for determining vehicle operational status in accordance with an embodiment of the invention is illustrated in FIG. 3. The process 300 can include identifying (310) vehicle data. The process 300 further includes determining (312) trip start data, accumulating (314) vehicle status data, determining (316) trip end data, and generating (318) vehicle trip data. In several embodiment, the process 300 further includes providing (320) data.

Specific processes for determining vehicle operational status and/or ignition status in accordance with embodiments of the invention are described above with respect to FIG. 3; however, any number of processes, including those that generate vehicle trip data in real time and those that transmit data to a remote server system, can be utilized as appropriate to the requirements of a specific application in accordance with embodiments of the invention. Techniques for accumulating vehicle status data and generating vehicle trip data in accordance with embodiments of the invention are described in more detail below.

Accumulating Vehicle Status Data

Vehicle status determination processes in accordance with embodiments of the invention can include determining when a vehicle is in a state of rest, i.e. when a vehicle has not yet begun a trip. In many embodiments, a vehicle is in a state of rest when the vehicle first powers up. In a number of embodiments, a vehicle is in a state of rest when it is determined that a trip has been completed. When a vehicle is in a state of rest, a variety of vehicle status data can be recorded regarding the status of the vehicle. This data includes, but is not limited to, the location (i.e. a latitude, longitude, and/or elevation) or the vehicle, the current voltage measured at the battery and/or alternator of the vehicle, the RPM of the vehicle's engine, and any other data as appropriate to the requirements of specific applications of embodiments of the invention. In a number of embodiments, the vehicle status determination device can be placed in a low-power state while the vehicle is at rest. For example, when a gasoline (or diesel) engine is unavailable, the vehicle status determination device can enter a low-power mode in order to reduce the load on the electrical system of the vehicle during periods when the electrical system is operating on battery power.

Vehicle status determination processes can also include determining when a vehicle leaves a state of rest and begins a trip. A variety of vehicle status data can be obtained and/or determined to indicate that the ignition of the vehicle is active and/or the beginning of the trip as appropriate to the requirements of specific applications of embodiments of the invention. This data includes, but is not limited to, detecting RPM data indicating that the engine is powering the vehicle, detecting voltage across the battery and/or alternator in excess of a threshold value (such as 13.1 volts), obtaining noise data indicating that the alternator, engine, or any other portion of the vehicle is active, detecting movement of the vehicle, and/or obtaining acceleration data indicating that the vehicle is moving. The data can be used individually and/or in combination to determine if a trip has begun. In a variety of embodiments, the initial vehicle location is pinned (i.e. stored) and compared against location data received at a later time to account for potential errors, such as GPS drift while the GPS receiver is stationary, in the obtained location data. In many embodiments, the vehicle status determination device is placed in an operating state when vehicular motion is detected.

In several embodiments, once the vehicle ignition status is determined to be active, the distance the vehicle moves can be accumulated. If the vehicle moves over a threshold distance within a threshold time, the start of a trip can be registered based on the motion of the vehicle. Once the vehicle is in motion, a variety of vehicle status data can be obtained and/or stored. Processes for obtaining and processing vehicle status data are described in more detail below. If it is determined that the vehicle is not in motion, the process can return to the rest state. For example, a particular embodiment can have a threshold distance of 100 meters and a 180 second delay timer. If the vehicle travels over 100 meters within 180 seconds, a trip start is registered and the vehicle status determination device records and processes a variety of vehicle status data. If not, the vehicle status determination device can return to a low-power state and wait for vehicular motion and/or ignition data indicating that the ignition is active.

Figure 4:
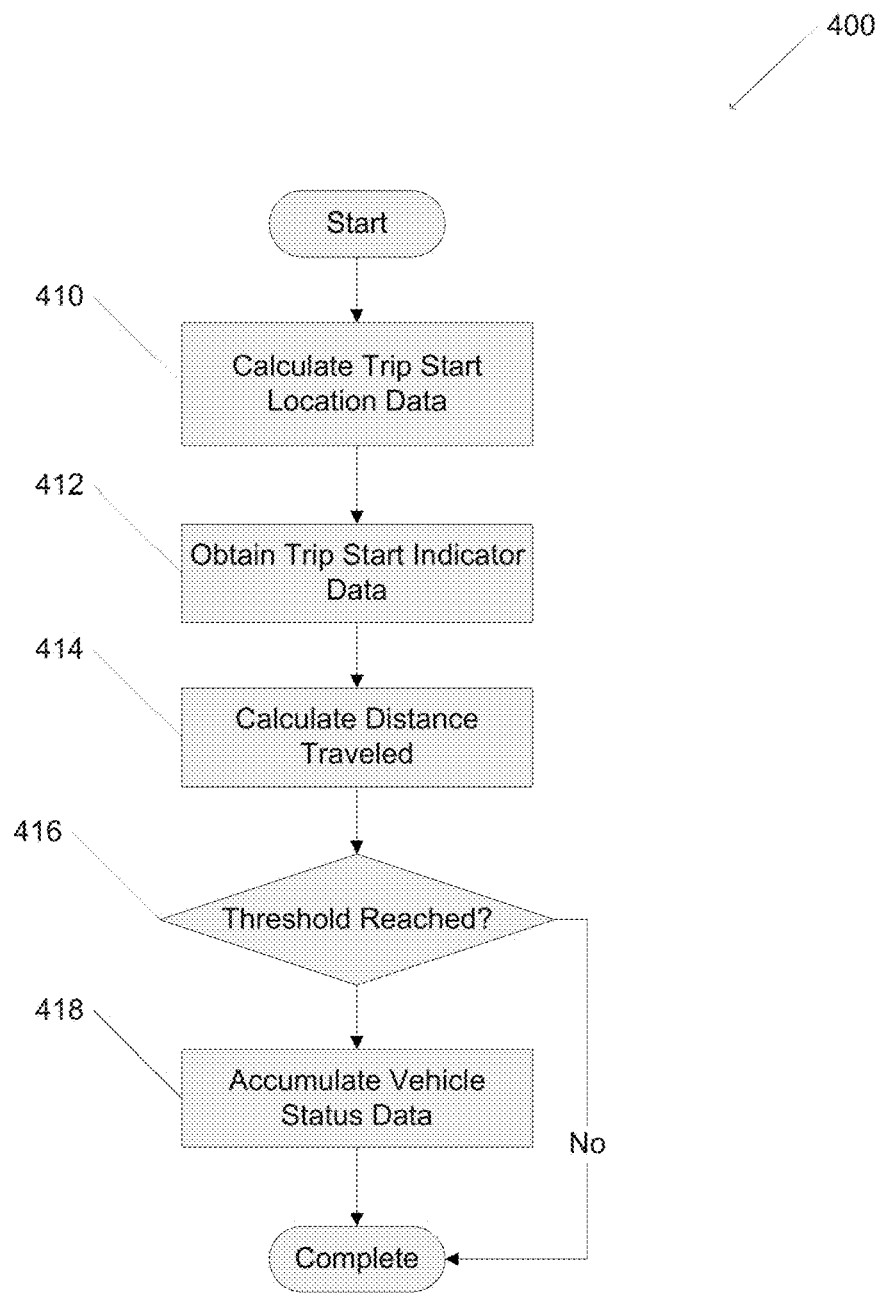
FIG. 4 is a flow chart illustrating a process for accumulating vehicle status data in accordance with an embodiment of the invention.

A process for accumulating trip data in accordance with an embodiment of the invention is illustrated in FIG. 4. The process 400 includes calculating (410) trip start location data, obtaining (412) trip start indicator data, and calculating (414) distance traveled. If a distance threshold is reached (416), vehicle status data is accumulated (418).

Although specific processes for accumulating trip data in accordance with embodiments of the invention are described above with respect to FIG. 4, any number of processes, including those that use alternative criteria for determining the start of a trip and those that accumulate data using any of a variety of data recordation techniques, can be utilized as appropriate to the requirements of a specific application in accordance with embodiments of the invention.

Generating Vehicle Trip Data

Vehicle status determination processes can include recording a variety of vehicle status data. This data can be collected while a vehicle is at rest and/or while the vehicle is in motion and varying data can be collected depending on the current state of the vehicle. The vehicle status data can include information related to the operation of a vehicle, including data concerning vehicle speed and acceleration, providing insight into driver behavior. Driver behaviors include, but are not limited to, performing hard cornering, excessive speeding, and suddenly stopping while driving. Vehicle behaviors include, but are not limited to, ignition detection, engine performance, braking performance, fuel economy, the location of the vehicle, the speed of the vehicle, and emission information. It should be noted, however, that any of a variety of vehicle status data can be collected as appropriate to the requirements of specific applications of embodiments of the invention.

In several embodiments, vehicle status determination processes include determining when a trip has ended. In a variety of embodiments, a vehicle stop is indicated when a variety of vehicle status data has been received. This data can include a lack of engine RPM data, voltage data below a threshold value, location data indicating the vehicle is not moving, and acceleration data below a threshold value. However, any other data (or subset of data) can be utilized as appropriate to the requirements of specific applications of embodiments of the invention. In many embodiments, the vehicle status data indicative of the end of a trip is measured for a particular time threshold, which can be pre-determined and/or determined dynamically. For example, if the above four conditions are met for 90 seconds, the vehicle status determination device can determine that the trip has ended. If any motion or other activity is detected during the 90 seconds, the vehicle status determination device continues to accumulate vehicle status data. Other threshold criteria can also be utilized alone or in conjunction with the time threshold, such as the distance threshold described above, as appropriate to the requirements of specific applications of embodiments of the invention.

In several embodiments, the use of a single technique for ignition detection can lead to false trip end data being generated and, consequently, incorrect vehicle trip data. For example, several embodiments utilize engine RPM data to determine if the vehicle ignition is active. However, many vehicles may have zero engine RPM data, such as those vehicles with automatic engine stop technology, but the vehicle ignition is still active. However, by utilizing a variety of factors to determine ignition status, these false trip end data can be avoided. For example, by analyzing alternator voltage in conjunction with the engine RPM data, it can be determined that the vehicle is still active even when the engine RPM data is zero. In this case, vehicle ignition off can be determined when engine RPM is zero and alternator voltage is below 13.1 volts as appropriate to the requirements of specific applications of embodiments of the invention. Accordingly, the false trip end data can be avoided and correct vehicle trip data can be generated.

Once a trip has ended, the collected vehicle status data can be processed to generate vehicle trip data describing the vehicle's trip. The vehicle trip data can include any aggregations of the collected vehicle status data, a subset of the vehicle status data, augmented vehicle status data with a variety of additional metadata (such as time data, driver data, etc.), and any other data collected during the trip as appropriate to the requirements of specific applications of embodiments of the invention.

Figure 5:
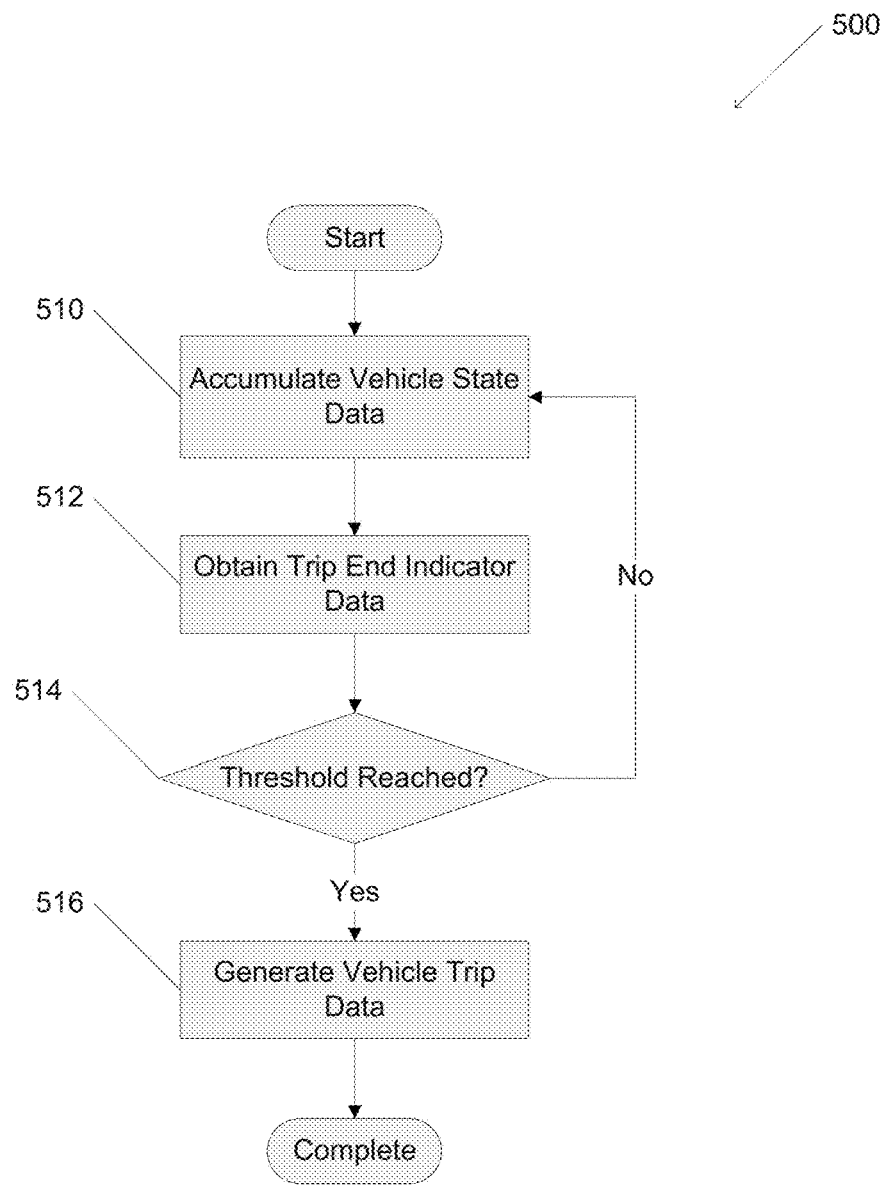
FIG. 5 is a flow chart illustrating a process for generating vehicle trip data in accordance with an embodiment of the invention.

A process for generating vehicle trip data in accordance with an embodiment of the invention is illustrated in FIG. 5. The process 500 includes accumulating (510) vehicle status data and obtaining (512) trip end indicator data. If the trip end threshold is reached (514), vehicle trip data is generated (516). If the trip end threshold is not reached (514), vehicle status data is accumulated (510).

Specific processes for generating vehicle trip data in accordance with embodiments of the invention are described above with respect to FIG. 5; however, any number of processes, including those that transmit vehicle status data to a remote server system for processing, can be utilized as appropriate to the requirements of a specific application in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A vehicle status determination device, comprising:
a processor; and
a memory connected to the processor and storing a vehicle status determination application;
wherein the vehicle status determination device is installed in a vehicle; and
wherein the vehicle status determination application directs the processor to:
determine ignition state data indicating that the vehicle is in a trip based on engine RPM data, where the engine RPM data describes the speed at which the engine is running;
record vehicle status data while the vehicle is in the trip;
obtain vehicle trip end data indicating that the vehicle is no longer in a trip based on the engine RPM data and a threshold value, where the trip has ended when the engine RPM data is below the threshold value for a period of time; and
generate vehicle trip data based on the vehicle status data.

2. The vehicle status determination device of claim 1, further comprising an accelerometer, where the accelerometer generates acceleration data.

3. The vehicle status determination device of claim 2, wherein the ignition state data comprises the acceleration data.

4. The vehicle status determination device of claim 2, wherein the vehicle status data comprises the acceleration data.

5. The vehicle status determination device of claim 1, further comprising a location determination device, where the location determination device generates location data.

6. The vehicle status determination device of claim 5, wherein the location determination device comprises a Global Positioning System (GPS) receiver.

7. The vehicle status determination device of claim 5, wherein the ignition state data comprises the location data.

8. The vehicle status determination device of claim 5, wherein the vehicle status data comprises the location data.

9. The vehicle status determination device of claim 1, further comprising a vibration determination device, where the vibration determination device generates vibration data.

10. The vehicle status determination device of claim 9, wherein the ignition state data comprises the vibration data.

11. The vehicle status determination device of claim 9, wherein the vehicle status data comprises the vibration data.

12. The vehicle status determination device of claim 9, wherein the vibration data is indicative of a running engine.

13. The vehicle status determination device of claim 1, further comprising a voltage detector, where the voltage detector generates voltage data.

14. The vehicle status determination device of claim 13, wherein the ignition state data comprises the voltage data.

15. The vehicle status determination device of claim 13, wherein the vehicle status data comprises the voltage data.

16. The vehicle status determination device of claim 1, wherein the vehicle status determination application directs the processor to enter a low-power mode when the vehicle trip end data indicates that the vehicle is no longer in a trip.

17. The vehicle status determination device of claim 1, wherein the vehicle status determination application directs the processor to enter an operating mode when the ignition state data indicates that the vehicle is in a trip.

18. The vehicle status determination device of claim 1, wherein:
the vehicle status determination device further comprises a connector connected to a vehicle data bus within the vehicle; and
the vehicle status determination application directs the processor to obtain vehicle status data using the vehicle data bus.

19. The vehicle status determination device of claim 1, wherein:
the vehicle status determination device further comprises a communications interface connected to the processor; and
the vehicle status determination application directs the processor to provide the vehicle trip data using the communications interface.

20. A method for determining the operational status of a vehicle, comprising:
determining ignition state data indicating that the vehicle is in a trip based on engine RPM data using a vehicle status determination device installed in the vehicle, where:
the vehicle status determination devices comprises a processor and a memory connected to the processor; and
the engine RPM data describes the speed at which the engine is running;
recording vehicle status data while the vehicle is in the trip using the vehicle status determination device;
obtaining vehicle trip end data indicating that the vehicle is no longer in a trip based on the engine RPM data and a threshold value using the vehicle status determination device, where the trip has ended when the engine RPM data is below the threshold value for a period of time; and
generating vehicle trip data based on the vehicle status data using the vehicle status determination device.

* * * * *